Feb. 19, 1946.   E. SCHLUETER   2,395,234
NUT LOCK
Filed June 5, 1944
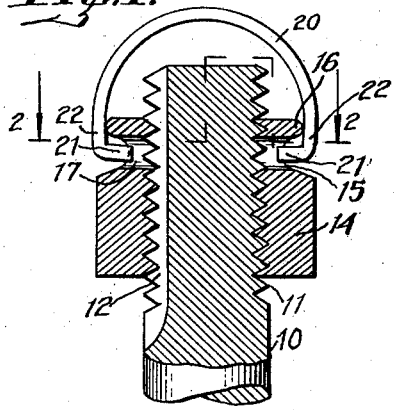
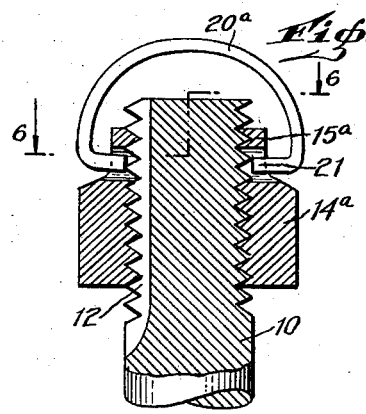
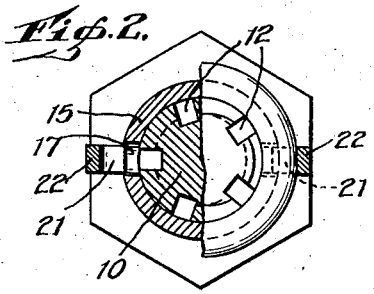
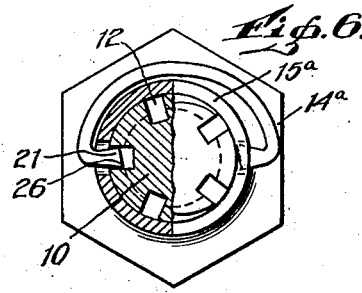
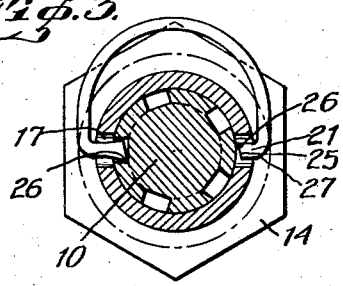
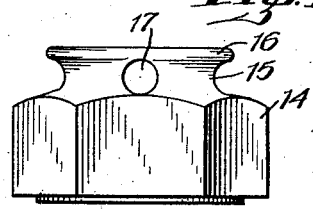
INVENTOR
ERNEST SCHLUETER
BY
ATTORNEY Patented Feb. 19, 1946

2,395,234

UNITED STATES PATENT OFFICE 2,395,234

NUT LOCK

Ernest Schlueter, Hollis, N. Y., assignor to Charles A. Simmons, New York, N. Y.

Application June 5, 1944, Serial No. 538,760

17 Claims. (Cl. 151—11)

This invention relates to nut locks and to means for locking together members having threaded connection and more particularly to devices in which an outer member or nut has threaded connection with an inner member or bolt, means being provided to prevent relative motion between the member when in adjusted locked position.

Objects of the invention are to provide an improved locking device of this kind which is easily and quickly operated to lock or unlock the threaded members in various adjusted positions, and which will hold the locking means, when unlocked out of contact with the threads, so that the parts may be freely relatively rotated.

Other objects of the invention are to provide an improved device of this kind which can be used with or without grooves in the bolt and in which the locked means does not interfere with the use of a wrench on the nut.

Additional objects of the invention are to effect simplicity and efficiency in such devices and to provide an extremely simple device of this kind which is easy to operate, durable, and reliable in operation, and economical to manufacture and assemble.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with improved nut lock assemblies each of which, briefly stated, includes a bolt having external threads and having spaced longitudinal grooves intersecting the threads, on which threads is received a nut having at the outer end face a tubular extension smaller in diameter than the outer diameters of the nut and provided with opposite diametric bores. A bail-shaped locking strip wider than thick has inwardly turned locking end portions in the bores engaged in one of the grooves when the bail part lies in a plane transverse to the axis of said member to lock the nut on the said member.

In the accompanying drawing showing, by way of example, two of many possible embodiments of the invention, Fig. 1 is an axial sectional view, party in elevation, showing one form of nut assembled on a bolt;

Fig. 2 is a sectional view, partly in plan, the section being taken substantially on the line 2—2 of Fig. 1, looking in the direction of the arrows of said line;

Fig. 3 is a transverse sectional view, partly in plan, showing the locked position;

Fig. 4 is a side elevation of the nut of Figs. 1 to 3;

Fig. 5 is an axial sectional view, partly in elevation, showing another form of the invention; and Fig. 6 is a sectional view partly in plan, the section being taken substantially on the line 6—6 of Fig. 5, looking in the direction of the arrow of said line.

My improved lock is shown in Figs. 1 to 3 in combination with a bolt 10 having threads 11 at the outer end portion and an uneven number of evenly spaced longitudinal grooves 12 intersecting and extending throughout the active portion of the threads.

An angular nut 14 received on the threads of said bolt has at the outer end face a tubular extension 15, 16 of much smaller diameter than the outer diameters of the nut and provided with a lateral end flange 16 forming between the flange and nut body a neck 15 having opposite diametric bores 17 greater in diameter than the width of the grooves.

A bail-shaped locking strip 20, 21 of thick spring strip material wider than thick has short inwardly turned locking end portions 21 engaged in the bores 17 and in a groove when the bail part 20 lies in a plane transverse to the axis of the bolt as in Fig. 3, to lock the nut on the bolt.

The bail part 20 of the strip has a radius greater than the radius of said flange, the distance between the ends 22 of the bail part near the locking end portions 21 being normally smaller than the outside diameter of the flange 16 when the bail part is in said transverse position of Fig. 2; whereby when the bail part is moved from said transverse position to a position at or near the axis of the bolt as in Fig. 1, said end parts 22 of the bail part cam on the periphery of the flange 16 to withdraw said locking end portions from the threads but not out of the bores 17, whereby the nut may be twirled on the bolt.

Said locking end portions 21 are thickest at their free end faces 25 (Fig. 3) and taper in a direction away from the said faces 25, to prevent the locking end portions, when in locking position, from riding out of the grooves.

If desired, the free end faces 25 of the locking portions 21 may be beveled to form biting edges 26 pointing somewhat rearwardly as the nut is screwed on and adapted to bite into the threads, between the grooves or if the grooves are omitted, when attempt is made to unscrew the nut or when the angular end portion 27 of the locking end is struck as with a hammer. When the edges 26 are provided the grooves 12 may be omitted if desired.

As the grooves 12 are of uneven number and adapted to receive either locking portion 21, to lock the nut, the number of locking positions is twice the number of grooves.

The operation will be readily understood from the foregoing. To assemble the nut on the bolt, the bail part is placed as in Fig. 1 and the nut is screwed home on the bolt with a wrench in the usual manner. If the exposed end portion of the bolt is long, the bail shaped part 20 is tilted enough to one side to allow the bolt to pass, but not enough to interfere with the wrench.

After the nut is sufficiently tight, the bail part 20 is moved to the position of Fig. 3 and with or without some further turning of the nut, one end portion 21 snaps into an adjacent groove.

If a finer adjustment is desired, the biting edges 26 are left between grooves, and the angular portion 27 is struck with a hammer to cause the edge 26 to bite into the threads sufficiently to lock the nut firmly. It is thus seen that this locking means can be used without any grooves 12 in the bolt.

To unlock the nut, the bail shaped part 20 is merely turned up to, or near to, the position of Fig. 1, thus fully withdrawing the ends 21 from the threads and grooves and fully unlocking the nut so it may be turned freely.

In the form of invention of Figs. 5 and 6, the nut 14a has at the outer end face a tubular extension 15a smaller in diameter than the outer diameters of the nut and provided with opposite diametric bores, but free of any flange such as the flange 16. In this form, the bail shaped locking strip 20a, 21 has locking end portions 21 as in Fig. 1, but the bail part 20a of the strip has a radius less than the radius of the body part of the nut, to avoid interference with a wrench. Due to the fact that the locking end portion 21 is wider than the groove, when the bail part 20a is moved to a position intersecting said axis, said locking end portion 21 will twist and cam out of the groove to withdraw the locking end portions from the grooves whereby the nuts may be turned.

In either form of the invention, the grooves 12 or the biting edges 26 may be provided or omitted as desired. If the grooves are omitted the biting edges should be provided. With either form of the invention, the bail part may be of large radius as in Fig. 3 or smaller radius as in Fig. 6.

The manual operation of the lock of Figs. 5 and 6 is the same as for Figs. 1 to 3; but in the from of Figs. 5 and 6, movement of the bail part 20a to the position of Fig. 5 merely cams the ends 21 out of the grooves, since the strip is wider than the groove, but leaves the end 21 in sliding contact with the threads as in Fig. 5.

The invention claimed is:

1. In combination, a member having external threads and having spaced longitudinal grooves intersecting the threads; a nut on said threads having at the outer end face a tubular extension smaller in diameter than the outer diameters of the nut and provided with opposite diametric bores; and a bail-shaped locking strip wider than thick and having inwardly turned locking end portions disposed in said bores engageable in one of the grooves when the bail part lies in a transverse position to the axis of said member to lock the nut on the said member; the bail part of the strip having a radius less than the radius of the body part of the nut, to avoid interference with a wrench; the locking ends being wider than the grooves, whereby when the bail part is moved to a position intersecting said axis, said locking end portions will twist and cam out of the groove to withdraw the locking end portions from the grooves whereby the nuts may be turned.

2. In combination, a bolt having threads at the outer end portion and an uneven number of evenly spaced longitudinal grooves intersecting and extending throughout the active portion of the threads; an angular nut received on the threads of said bolt having at the outer end face a tubular extension of much smaller diameter than the outer diameters of the nut and provided with a lateral end flange forming between the flange and nut body a neck having opposite diametric bores wider than the width of the grooves; and a bail-shaped locking strip of thick spring strip material wider than thick and having short inwardly turned locking end portions disposed in the bores and engageable in the groove only when the bail part lies in a plane transverse to the axis of the bolt, to lock the nut on the bolt.

3. In a combination as in claim 2, the bail part of the strip having a radius greater than the radius of said flange, the distance between the ends of the bail part near the locking end portions being normally smaller than the outside diameter of the flange when the bail part is in said transverse position, whereby when the bail part is moved from said transverse position to a position near the axis of the bolt, said end parts of the bail part cam on the periphery of the flange to withdraw said locking end portions from the threads but not out of the bores, whereby the nut may be twirled on the bolt.

4. In a combination as in claim 2, said locking end portions being thickest at their free ends and tapered in a direction away from the thick ends, to prevent the locking end portions, when in locking position from riding out of the grooves.

5. In a combination as in claim 2, the free end face of the locking end portions being beveled to form a biting edge pointing somewhat rearwardly as the nut is screwed on and adapted to bite into the threads, between the grooves when attempt is made to unscrew the nut or when the angular end portion of the locking end is struck as with a hammer.

6. In combination, a member having threads and a groove intersecting the threads; a threaded member engaged on said threads and provided with opposite bores; and a locking member having end portions in the bores at least one of which is engageable in the groove to lock the members together; the grooves and end portions being of such relative shape that when the end portion in the groove is turned on its axis, it will cam out of the groove.

7. In combination, a member having threads and longitudinal grooves intersecting the threads; a threaded member engaged on said threads and provided with opposite bores; and a locking strip having locking end portions in the bores and engageable in the grooves to lock the members together; the locking end portions being wider than thick, and when in locking position being from front to rear thickest at the free end and immediately tapering away from said free end for a distance as great as the depth of the groove, to prevent the locking ends from being forced from the grooves when the members tend to relatively move.

8. In combination, a member having external threads; a threaded member engaged on said threads and provided with opposite bores; and a bail-shaped locking member having inturned end portions in the bores, at least one of which portions is a locking end portion adapted to engage the threads when the bail-shaped part is disposed in a plane transverse to the axis of the threaded member, said locking member being pivotally movable to said plane on either side of said axis; said locking end having a biting edge adapted to point somewhat rearwardly as the second member is being screwed home and the bail part is in said plane on one side of the axis and to point somewhat forwardly when the bail part is moved to the opposite side of said axis.

9. In combination, a member having external threads; a threaded member engaged on said threads and provided with opposite bores; and a bail-shaped locking member having inturned end portions in the bores one of which is provided with a biting edge adapted to point somewhat rearwardly as the second member is being screwed home and the bail part is disposed in a plane transverse to the axis of the threaded member; said inturned end having the biting edge being disposed substantially radial to said first member, and substantially at right angles to the adjacent portion of the bail-shaped part and projecting far enough from the periphery of the second member to be struck with a hammer at a point alined with said portion to cause said edge to bite into said threads.

10. In combination, a member having threads and a groove intersecting the threads; a threaded member engaged on said threads and provided with opposite bores; and a locking member having locking end portions rotatable in the bores at least one of which end portions is engageable in the groove to lock the members together; the locking end portions being wider than thick and wider than said grooves and adapted to twist slightly; whereby the grooves and the locking end portions are of such relative shape when the end portion in the groove is turned on its axis that the end portion will cam out of the groove.

11. In combination, a bolt having threads thereon and longitudinal grooves intersecting the threads; an angular nut received on the threads of said bolt having at the outer end face a tubular extension of smaller diameter than the outer diameters of the nut and provided with a lateral end flange forming between the flange and nut body a neck having opposite diametric bores between the flange and nut and wider than the width of the grooves; and a bail-shaped locking strip of thick spring strip material wider than thick and comprising a bail part having short inwardly turned locking end portions disposed in the bores and engaged in the grooves when the bail part lies in a plane transverse to the axis of the bolt, to lock the nut on the bolt; the bail part of the strip having a radius greater than the radius of said flange, the distance between the ends of the bail part near the locking end portions being normally smaller than the outside diameter of the flange when the bail part is in said transverse plane, whereby when the bail part is moved from said transverse plane to a position near the axis of the bolt, said end parts of the bail part cam on the periphery of the flange to withdraw said locking end portions from the grooves but not out of the bores.

12. In combination, a bolt having threads thereon and longitudinal grooves intersecting the threads; a nut received on the threads of said bolt having at the outer end face a tubular extension of smaller diameter than the outer diameters of the nut and provided with a continuous lateral end flange of substantially constant diameter forming between the flange and nut body a neck having opposite diametric bores between the flange and nut; and a bail-shaped locking member of spring material comprising a bail part having short inwardly turned locking end portions disposed in the bores and engaged in the grooves when the bail part lies in a plane transverse to the axis of the bolt, to lock the nut on the bolt; the bail part of the strip having a radius greater than the radius of said flange, the distance between the ends of the bail part near the locking end portions being normally smaller than the outside diameter of the flange when the bail part is in said transverse plane, whereby when the bail part is moved from said transverse plane to a position near the axis of the bolt, said end parts of the bail part cam on the periphery of the flange to withdraw said locking end portions from the grooves but not out of the bores.

13. In combination, a substantially cylindrical member having grooves in its outer face; a tubular member received on said member having at the outer end face a tubular extension of smaller diameter than the outer diameter of said member and provided with a lateral end flange forming between the flange and body of the member a neck having opposite diametric bores between the flange and said body; and a bail-shaped locking member of thick spring material comprising a bail part having short inwardly turned locking end portions disposed in the bores and engaged in the grooves when the bail part lies in a plane transverse to the axis of the cylindrical member to lock the tubular member thereon; the mid-part of said bail part having a radius greater than the radius of said flange, the distance between the ends of the bail part near the locking end portions being normally smaller than the outside diameter of the flange when the bail part is in said transverse plane, whereby when the bail part is moved from said transverse plane to a position near the axis of the bolt, said end parts of the bail part cam on the periphery of the flange to withdraw said locking end portions from the grooves but not out of the bores.

14. In combination, an external member having a groove intersecting the threads; an internally threaded member engaged on said threads and provided with opposite bores; and a locking member having inturned end portions in the bores, at least one end portion being engageable substantially in the bottom of the groove to lock the threaded members together; the free end of the end portion being when in locking position thick from front to rear and thickest at the extreme free end to provide progressively less front to rear thickness away from said extreme free end, thereby to prevent the inturned end from being forced and cammed from the grooves when the threaded members are urged to relatively rotate.

15. In combination, an externally threaded member having a longitudinal groove intersecting the threads; an internally threaded member engaged on said threads and provided with opposite bores; and a locking strip having inturned end portions in the bores at least one end being engageable in the groove to lock the members together; the extreme free end of the locking end portion being, when in locking position, thick from front to rear and thicker from front to rear than any other part, in the groove, of the locking end portion, to prevent the locking ends from being cammed and forced from the grooves when the threaded members are urged to relatively rotate.

16. In combination, an externally threaded member having longitudinal groove intersecting the threads; an internally threaded member engaged on said threads and provided with substantially opposite bores; and a locking member having locking end portions in the bores, either of which end portions may engaged in any one of the grooves to lock the members together; the grooves being evenly spaced and uneven in number, the bores and grooves being so positioned that when one locking member is between adjacent grooves, the other locking member is in position to lock in a groove, thereby providing twice as many relative locking positions of the threaded members as there are grooves, thus economizing the cost of grooves and avoiding excessive weakening of the threads.

17. In combination, a member having threads and longitudinal grooves intersecting the threads; a threaded member engaged on said threads and provided with substantially diametrically opposite bores; and a bail-shaped locking member having locking end portions in the bores either of which may engage in any one of the grooves, the grooves being evenly spaced and uneven in number whereby the number of relative locking positions of the threaded members is twice the number of said grooves.

ERNEST SCHLUETER.